A. N. JENSEN.
SWITCH FOR OVERHEAD CARRIERS.
APPLICATION FILED JUNE 6, 1912.
1,043,599.
Patented Nov. 5, 1912.
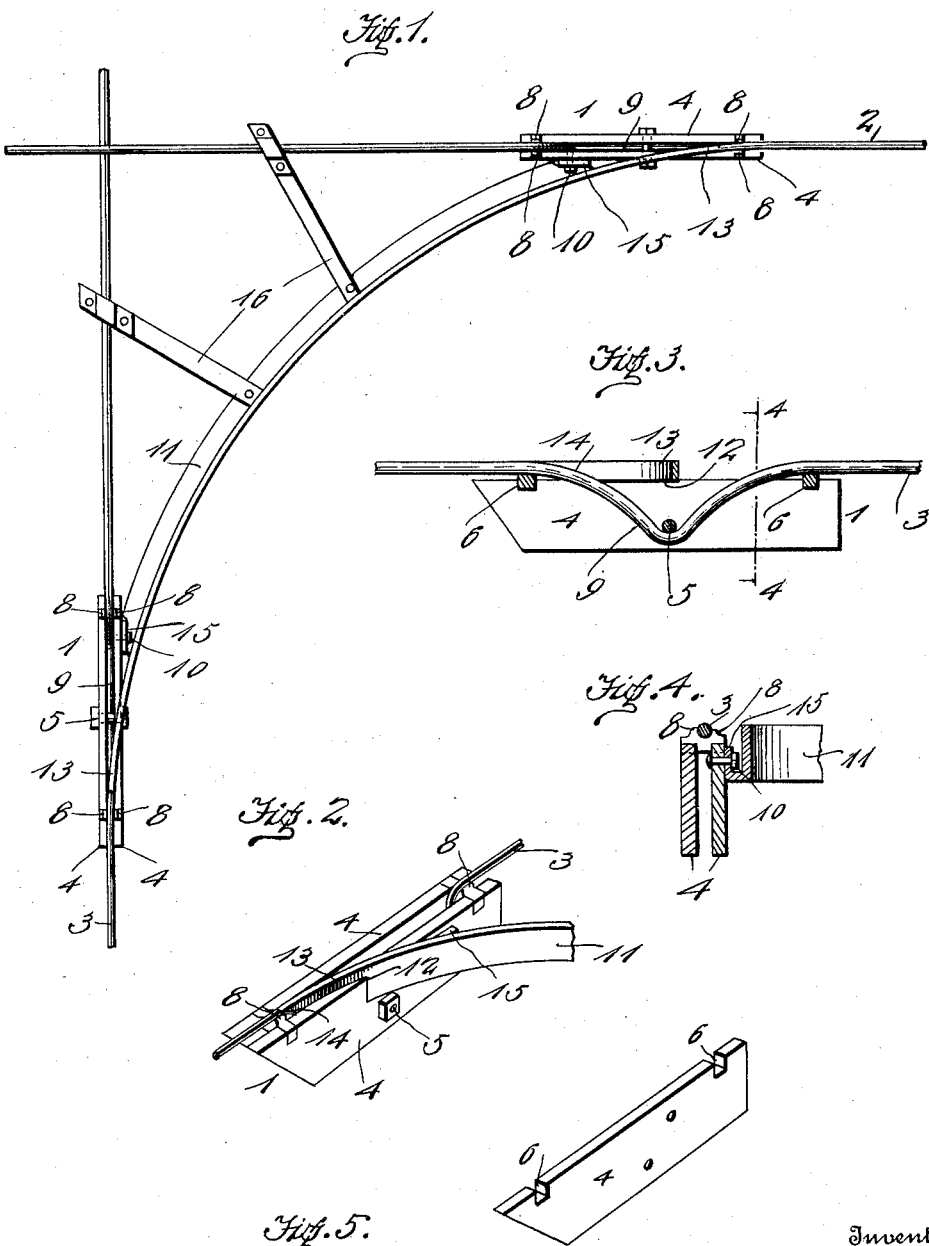

UNITED STATES PATENT OFFICE.

ALFRED N. JENSEN, OF EMMETSBURG, IOWA.

SWITCH FOR OVERHEAD CARRIERS.

1,043,599.  Specification of Letters Patent.  Patented Nov. 5, 1912.

Application filed June 6, 1912. Serial No. 702,091.

*To all whom it may concern:*

Be it known that I, ALFRED N. JENSEN, a citizen of the United States, residing at Emmetsburg, in the county of Palo Alto and State of Iowa, have invented certain new and useful Improvements in Switches for Overhead Carriers; and I do declare the following to be a full, clear, and exact description of the invention, such as will enable others skilled in the art to which it appertains to make and use the same.

This invention relates to improvements in switches for overhead carriers.

One object of the invention is to provide a switch of this character whereby the carrier may readily pass from one track or supporting cable to another track or cable arranged at right angles to the former without jumping or becoming disengaged from the cables.

Another object is to provide a switch of this character which will be simple, strong and durable in construction, efficient in operation and well adapted to the purpose for which it is designed.

With these and other objects in view, the invention consists of certain novel features of construction and the combination and arrangement of parts as will be more fully described and claimed.

In the accompanying drawings; Figure 1 is a plan view of two track cables arranged at right angles to and crossing each other, showing the application of my improved switch; Fig. 2 is a perspective view of one end of the switch and the means for connecting the same to the cable; Fig. 3 is a vertical longitudinal section of the switch attaching member shown in Fig. 2; Fig. 4 is a vertical cross section thereof taken on the line 4—4 of Fig. 3; Fig. 5 is a detail perspective view of one of the plates of the switch attaching member.

My improved switch comprises attaching members 1, one of which is engaged with and secured to each of the cables or tracks 3 to which the switch is to be applied, at a suitable distance from the point where the cables cross as clearly shown in Fig. 1 of the drawings. Each of the attaching members 1 comprises a pair of parallel plates 4 of suitable size and shape, said plates being spaced apart a sufficient distance to receive between the same the cables 2 and 3 to which they are securely bolted by clamping bolts 5 which are engaged with the plates intermediate their ends and near their lower edges as shown.

In the upper edges of the plates 4 of the attaching members near the ends of the plates are alined notches or recesses 6 with which are engaged short cable supporting bars on the upper edges of which intermediate their ends are formed upwardly projecting cable retaining lugs 8 between which the cables pass after being engaged between the plates 4 as shown. In applying the attaching members 1 to the cables the latter are bent to form downwardly projecting loops 9 which are engaged between the plates 4 and beneath the bolts 5 which clamp the plates to and support the same on the looped portions of the cables. The straight portions of the cables at the upper ends of the loops are engaged between the lugs 8 on the bars 7, said lugs thus retaining the cables in position and holding the attaching members in alinement with the cables.

Secured at its ends by bolts 10 to the outer side of the inner plate 4 of the attaching members is a curved switch bar or plate 11 which extends between and connects with the attaching members on the cables as clearly shown in Fig. 1 of the drawing. The switch member 11 is preferably in the form of an angle iron bar or plate, the ends of which are recessed on their lower edges as shown at 12 to form narrow tongues 13 which engage the upper edges of the plates 4, said tongues being of such width that their upper edges and the corresponding upper edges of the main portion of the switch member will be in line, or in the same horizontal plane with the upper surfaces of the cables. The outer ends of the tongues are beveled as at 14 to closely fit the portions of the cables with which said ends of the tongues are engaged so that the upper portion of the switch members form practically a continuation of the cables which said switch member connects. In attaching the switch member to the inner plate 4 of the attaching members, the ends of the lower flange of the switch member opposite the recessed or cut away portions thereof are bent upwardly to form attaching lugs 15 which are provided with bolt holes to receive the fastening bolts 10 which connect the switch member with said attaching member. The switch member is also preferably further braced and secured to the crossing cables by means of short brace bars 16 which are suitably connected to the lower flange of the switch member and to the cables as shown.

By constructing and arranging my improved switch as herein shown and described it will be seen that the carrier in passing from one cable to another over the switch is not required to rise and will not jump when passing from either cable onto the switch member owing to the flush engagement of the switch with the cable and to the depression or downward bend in the latter which permits the wheels of the carrier to pass freely and smoothly from the cable onto the switch member.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. The combination with carrier supporting track cables having therein depending loops, of switch attaching members fastened to said looped portions of the cables, means carried by the opposite ends of said switch attaching members for supporting the track cables above and adjacent to the looped portions thereof, and a switch member secured to said attaching members and having its ends engaged with said cables at the point where the loop is formed therein, thereby providing a smooth unobstructed surface, whereby the carrier supported by said cables is permitted to run from the cables onto the switch member.

2. The combination with a pair of crossed carrier supporting track cables having therein depending loops, of switch attaching members comprising pairs of plates fastened to the looped portions of said cables, cable supporting bars arranged in the upper edges of said plates, retaining lugs formed on said bars to receive the cables at the upper ends of the loops therein, a switch member comprising a plate fastened at its ends to said attaching members, and tongues formed on the ends of said plate and adapted to engage the track cables at the points where the bends or recesses are formed therein whereby a smooth unobstructed connection between the switch member and the cables is formed.

3. The combination with a pair of crossed carrier supporting track cables having therein depending loops; of switch attaching members comprising plates engaged with the opposite sides of the loops in said cables, bolts arranged through said plates and through the loops in said cables whereby the plates are fastened in position on said loops, cable supporting bars arranged in the upper edges of said plates whereby the cables are supported at the ends of the loops therein, retaining lugs on said bars to hold the cables in alinement with the plates, a switch member comprising a curved angle iron plate having its ends cut to form tongues adapted to be engaged with the upper edges of the attaching plates and with the cables whereby one cable is connected with the other, attaching lugs on the ends of said switch plate, bolts to engage said lugs and fasten the switch member to said attaching members, and braces to connect the switch member with said track cables.

In testimony whereof I have hereunto set my hand in presence of two subscribing witnesses.

ALFRED N. JENSEN.

Witnesses:
DWIGHT G. MCCARTY,
MABEL GRAINGER.

---

Copies of this patent may be obtained for five cents each, by addressing the "Commissioner of Patents, Washington, D. C."